(12) United States Patent
Li et al.

(10) Patent No.: US 10,863,190 B2
(45) Date of Patent: Dec. 8, 2020

(54) TECHNIQUES FOR MEMORY BANDWIDTH OPTIMIZATION IN BI-PREDICTED MOTION VECTOR REFINEMENT

(71) Applicant: TENCENT AMERICA LLC, Palo Alto, CA (US)

(72) Inventors: Xiang Li, Los Gatos, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/202,929

(22) Filed: Nov. 28, 2018

(65) Prior Publication Data

US 2019/0387245 A1 Dec. 19, 2019

Related U.S. Application Data

(60) Provisional application No. 62/685,257, filed on Jun. 14, 2018.

(51) Int. Cl.
| | |
|---|---|
| *H04N 19/176* | (2014.01) |
| *H04N 19/159* | (2014.01) |
| *H04N 19/132* | (2014.01) |
| *H04N 19/44* | (2014.01) |
| *H04N 19/52* | (2014.01) |
| *H04N 19/517* | (2014.01) |
| *H04N 19/139* | (2014.01) |
| *H04N 19/80* | (2014.01) |

(52) U.S. Cl.
CPC ......... *H04N 19/517* (2014.11); *H04N 19/132* (2014.11); *H04N 19/139* (2014.11); *H04N 19/176* (2014.11); *H04N 19/80* (2014.11)

(58) Field of Classification Search
CPC .... H04N 19/577; H04N 19/44; H04N 19/573; H04N 19/176; H04N 19/513; H04N 19/533; H04N 19/517
See application file for complete search history.

(56) References Cited

U.S. PATENT DOCUMENTS

| | | | |
|---|---|---|---|
| 2018/0041769 A1* | 2/2018 | Chuang | H04N 19/176 |
| 2018/0192071 A1* | 7/2018 | Chuang | H04N 19/577 |
| 2018/0199057 A1* | 7/2018 | Chuang | H04N 19/56 |
| 2018/0278949 A1* | 9/2018 | Karczewicz | H04N 19/577 |
| 2018/0316929 A1* | 11/2018 | Li | H04N 19/56 |
| 2020/0007889 A1* | 1/2020 | Chao | H04N 19/52 |

OTHER PUBLICATIONS

Chen et al., Algorithm Description of Joint Exploration Test Model 6 (JEM 6), Joint Video Exploration Team (JVET) of ITU-T SG 16 WP 3 and ISO/IEC JTC 1/SC 29/WG 11 6th Meeting: Hobart, AU, Mar. 31-Apr. 7, 2017, Document: JVET-F1001-v2, entire document (Year: 2017).*

* cited by examiner

*Primary Examiner* — Alison Slater
(74) *Attorney, Agent, or Firm* — Sughrue Mion, PLLC

(57) ABSTRACT

A method and apparatus for encoding of a video sequence in an encoder or decoding of the video sequence in a decoder includes parsing an initial motion vector from the video sequence associated with a block. A plurality of samples are determined and pre-fetched to permit both motion vector refinement and motion compensation based on parsing the initial motion vector. Motion vector refinement is performed to determine a final motion vector using a first subset of the plurality of samples, and motion compensation is performed using a second subset of the plurality of samples.

12 Claims, 10 Drawing Sheets

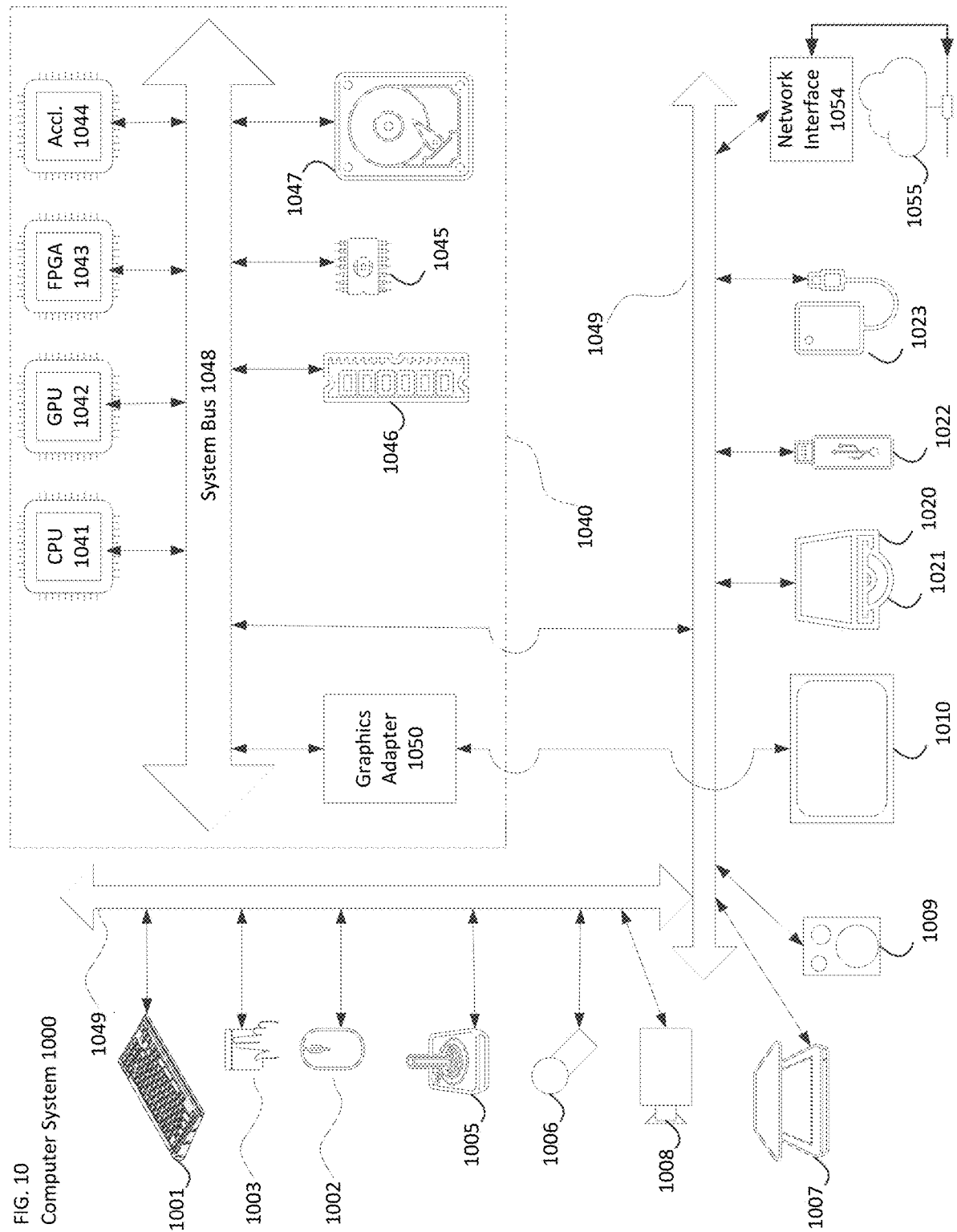

TECHNIQUES FOR MEMORY BANDWIDTH OPTIMIZATION IN BI-PREDICTED MOTION VECTOR REFINEMENT

CROSS-REFERENCE TO RELATED APPLICATION(S)

This application claims priority under 35 U.S.C. § 119 from U.S. Provisional Application No. 62/685,257 filed on Jun. 14, 2018 in the U.S. Patent & Trademark Office, the disclosure of which is incorporated herein by reference in its entirety.

FIELD

The disclosed subject matter relates to video coding and decoding, and more specifically, to the selection of motion compensation interpolation filters in relation to memory bandwidth in the presence of motion vector refinement.

BACKGROUND

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example, 60 pictures per second or 60 Hz. Uncompressed video has significant bitrate requirements. For example, 1080p60 4:2:0 video at 8 bits per sample (1920×1080 luminance sample resolution at 60 Hz frame rate) requires close to 1.5 Gbit/s bandwidth. An hour of such video requires more than 600 GByte of storage space.

One purpose of video coding and decoding includes the reduction of redundancy in the input video signal, through compression. Compression can help reducing aforementioned bandwidth or storage space requirements, in some cases by two orders of magnitude or more. Both lossless and lossy compression, as well as a combination thereof, can be employed. Lossless compression refers to techniques where an exact copy of the original signal can be reconstructed from the compressed original signal. When using lossy compression, the reconstructed signal may not be identical to the original signal, but the distortion between original and reconstructed signal is negligible so as to render the reconstructed signal useful for the intended application. In the case of video, lossy compression is widely employed. The amount of tolerated distortion depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

The motion vector to be used in the motion compensation can be of sub-sample (sub-pel) accuracy. In at least such cases, motion compensation involves interpolation of the reconstructed sample from a plurality of reference picture samples, using an interpolation filter. Such an interpolation filter can, for example, include an 8 tap (in each dimension) filter. More generally, the use of an n-tap interpolation filter can require the use of n samples for interpolation. Henceforth, only filtering in a single dimension is considered; a person skilled in the art can readily generalize the one-dimensional considerations described herein to additional dimensions.

In some cases, the motion vector used in the motion compensation can be coded directly in the bitstream, or as difference information relative to already reconstructed metadata, such as the motion vector data of blocks of the picture under reconstruction. In other cases, however, that motion vector can itself be the result of decoder-side interpolation. A well-known technique for such decoder-side motion vector derivation is known in the case of bi-predicted blocks, where the motion vector to be used for motion compensation can be interpolated from the motion vectors used in the two reference blocks.

Yet other techniques can require the use of sample data (in contrast to metadata) belonging to the picture under reconstruction in the creation of a motion vector for the use to motion compensate a block. For example, one such technique is described in JVET-D0029, entitled "Decoder-Side Motion Vector Refinement Based on Bilateral Template Matching" available from http://phenix.it-sudparis.eu/jvet/doc_end_user/current_document.php?id=2725. The technique described therein can be used in the context of bi-prediction (prediction from two reference pictures). Motion compensation according to this exemplary technique involves the creation of a template block using traditional bi-predictive reconstruction technique. That template can be used for a decoder-side motion "search" mechanism, out of which refinement motion vectors can be generated, which, in turn are the input for the motion compensation step. According to JVET-D0029, such technique can have significant positive impact on the compression performance of a codec.

SUMMARY

Disclosed herein are techniques for improving memory access bandwidth in a video encoder/decoder that uses decoder-side motion vector refinement. According to some embodiments herein, only a well-defined number, that can be zero, of samples need to be pre-fetched when using motion vector refinement, and such pre-fetch can occur in a single pipeline step.

According to an aspect of the disclosure, a method for encoding of a video sequence in an encoder or decoding of the video sequence in a decoder includes parsing an initial motion vector from the video sequence associated with a block; determining a plurality of samples to permit both motion vector refinement and motion compensation based on parsing the initial motion vector; pre-fetching the plurality of samples; performing the motion vector refinement to determine a final motion vector using a first subset of the plurality of samples; and performing the motion compensation using a second subset of the plurality of samples.

According to an aspect of the disclosure, a device for encoding of a video sequence in an encoder or decoding of the video sequence in a decoder includes at least one memory configured to store program code; and at least one processor configured to read the program code and operate as instructed by the program code, the program code including: parsing code configured to cause the at least one processor to parse an initial motion vector from the video sequence associated with a block; determining code configured to cause the at least one processor to determine a plurality of samples to permit both motion vector refinement and motion compensation based on parsing the initial motion vector; pre-fetching code to pre-fetch the plurality of samples; first performing code configured to cause the at least one processor to perform the motion vector refinement to determine a final motion vector using a first subset of the plurality of samples; and second performing code to perform the motion compensation using a second subset of the plurality of samples.

According to an aspect of the disclosure, a non-transitory computer-readable medium storing instructions, the instructions comprising: one or more instructions that, when executed by one or more processors of a device, cause the one or more processors to: parse an initial motion vector from the video sequence associated with a block; determine a plurality of samples to permit both motion vector refinement and motion compensation based on parsing the initial motion vector; pre-fetch the plurality of samples; perform the motion vector refinement to determine a final motion vector using a first subset of the plurality of samples; and perform the motion compensation using a second subset of the plurality of samples.

BRIEF DESCRIPTION OF THE DRAWINGS

Further features, the nature, and various advantages of the disclosed subject matter will be more apparent from the following detailed description and the accompanying drawings in which:

FIG. 10 is a schematic illustration of a computer system in accordance with an embodiment.

PROBLEM TO BE SOLVED

Techniques such as the one described in JVET-D0029 can have a significant impact on the memory bandwidth requirements of a decoder. Specifically, the sample data required for the refinement step (template generation) may be different from the sample data used for reconstruction, requiring the decoder to access, for the reconstruction of a given block, more sample data than what would be needed if only traditional bi-prediction were in use. Using one or more techniques, the additional memory bandwidth, if any, needs to be determinable, and minimized in relation to the coding gain observed based on the minimization-imposed constraints.

DETAILED DESCRIPTION

Figure 1:
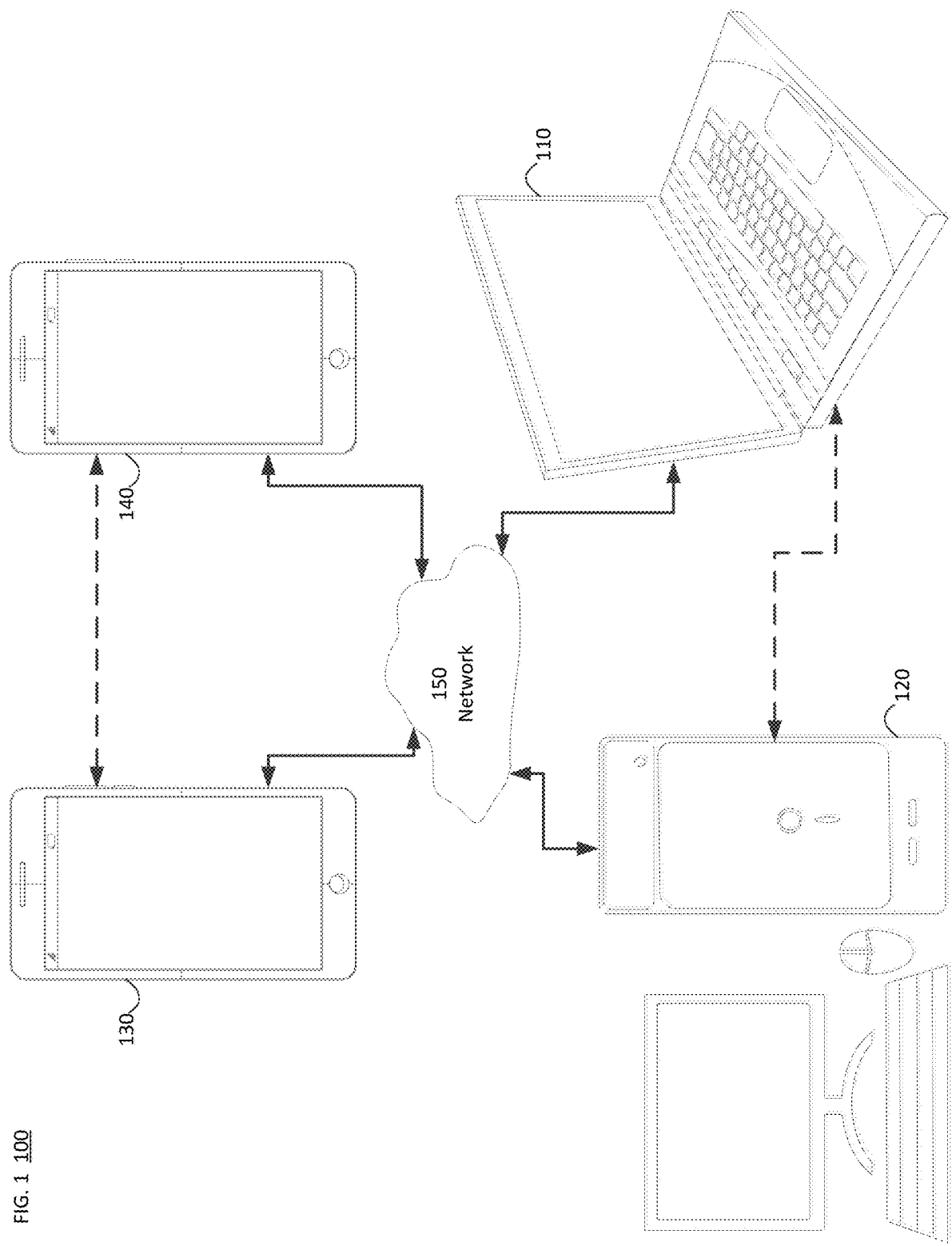
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110-120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
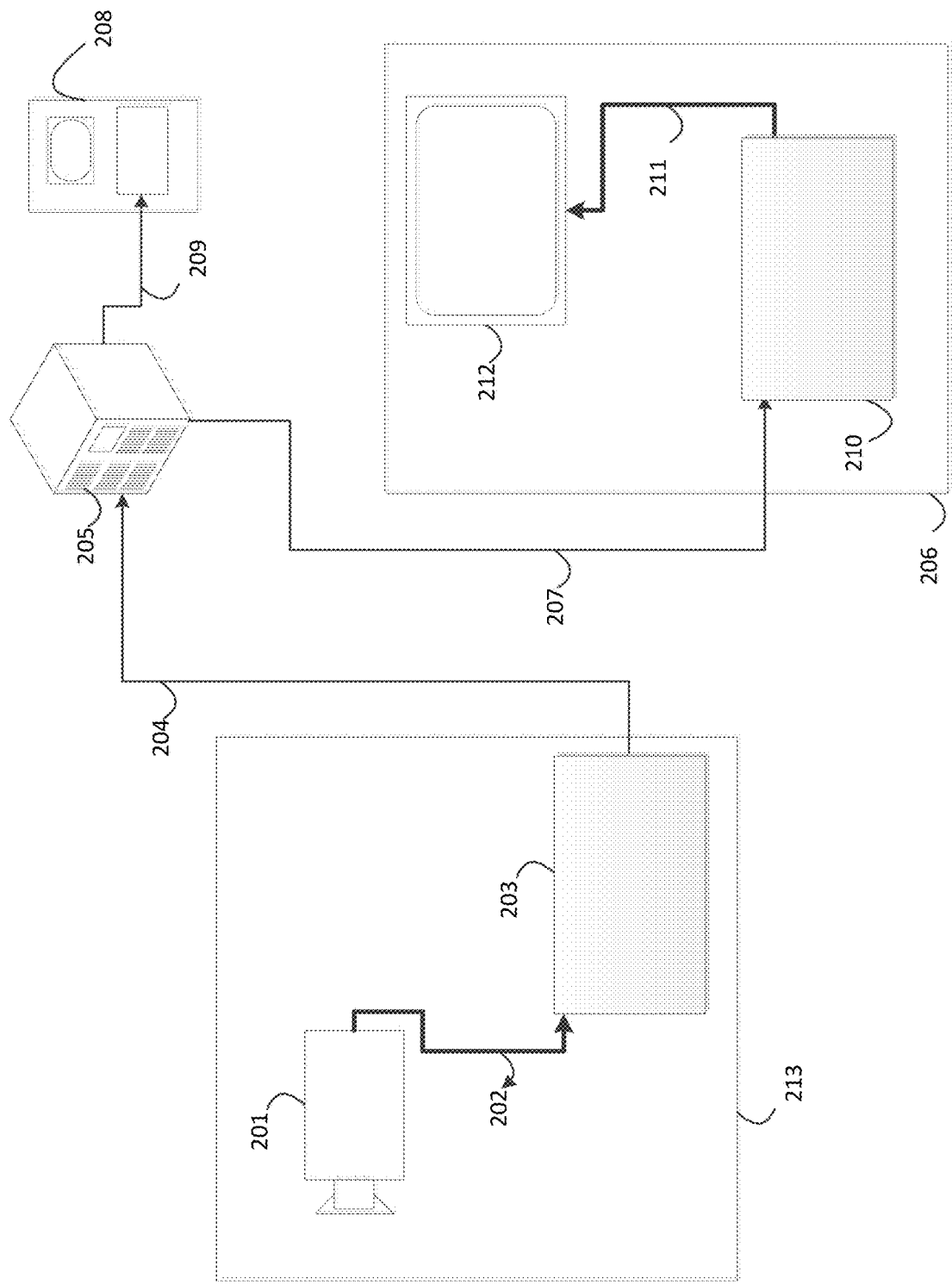
FIG. 2 is a schematic illustration of a simplified block diagram of a streaming system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating a for example uncompressed video sample stream (202). That sample stream (202), depicted as a bold line to emphasize a high data volume when compared to encoded video bitstreams, can be processed by an encoder (203) coupled to the camera (201). The encoder (203) can include hardware, software, or a combination thereof to enable or implement aspects of the disclosed subject matter as described in more detail below. The encoded video bitstream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which decodes the incoming copy of the encoded video bitstream (207) and creates an outgoing video sample stream (211) that can be rendered on a display (212) or other rendering device (not depicted). In some streaming systems, the video bitstreams (204, 207, 209) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

Figure 3:
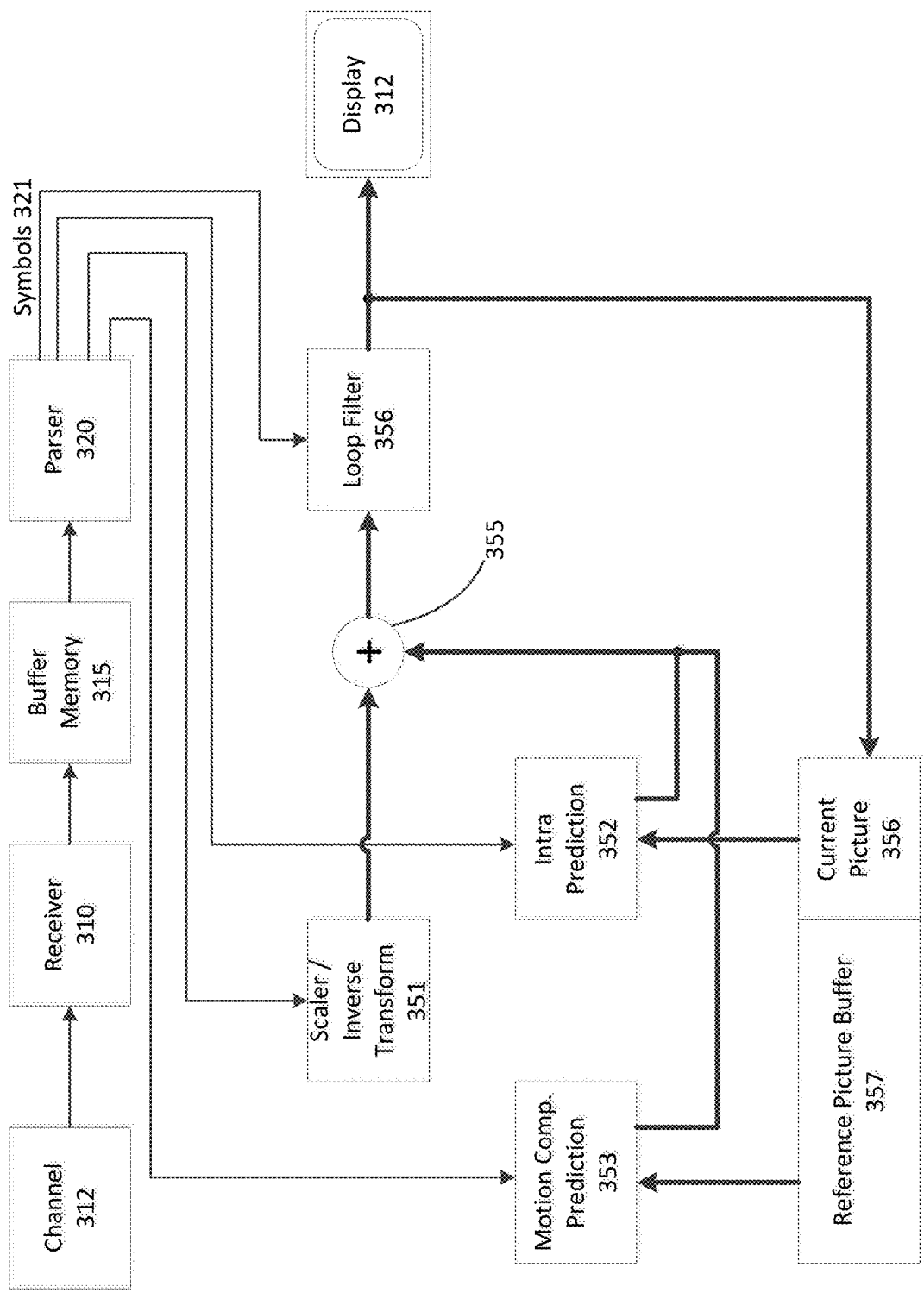
FIG. 3 is a schematic illustration of a simplified block diagram of a decoder in accordance with an embodiment.

FIG. 3 may be a functional block diagram of a video decoder (210) according to an embodiment of the present invention.

A receiver (310) may receive one or more codec video sequences to be decoded by the decoder (210); in the same or another embodiment, one coded video sequence at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between receiver (310) and entropy decoder/parser (320) ("parser" henceforth). When receiver (310) is receiving data from a store/forward device of sufficient bandwidth and controllability, or from an isosynchronous network, the buffer (315) may not be needed, or can be small. For use on best effort packet networks such as the Internet, the buffer (315) may be required, can be comparatively large and can advantageously be of adaptive size.

The video decoder (210) may include a parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as was shown in FIG. 2. The control information for the rendering device(s) may be in the form of Supplementary Enhancement Information (SEI) messages or Video Usability Information (VUI) parameter set fragments (not depicted). The parser (320) may parse/entropy-decode the received coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives quantized transform coefficient as well as control information, including which transform to use, block size, quantization factor, quantization scaling matrices, etc. as symbol(s) (321) from the parser (320). It can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (356). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (212) as well as stored in the reference picture memory (356) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (356) can become part of the reference picture buffer (357), and a fresh current picture memory can be reallocated before commencing the reconstruction of the following coded picture.

The video decoder 320 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video data. The additional data may be included as part of the coded video sequence(s). The additional data may be used by the video decoder (320) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
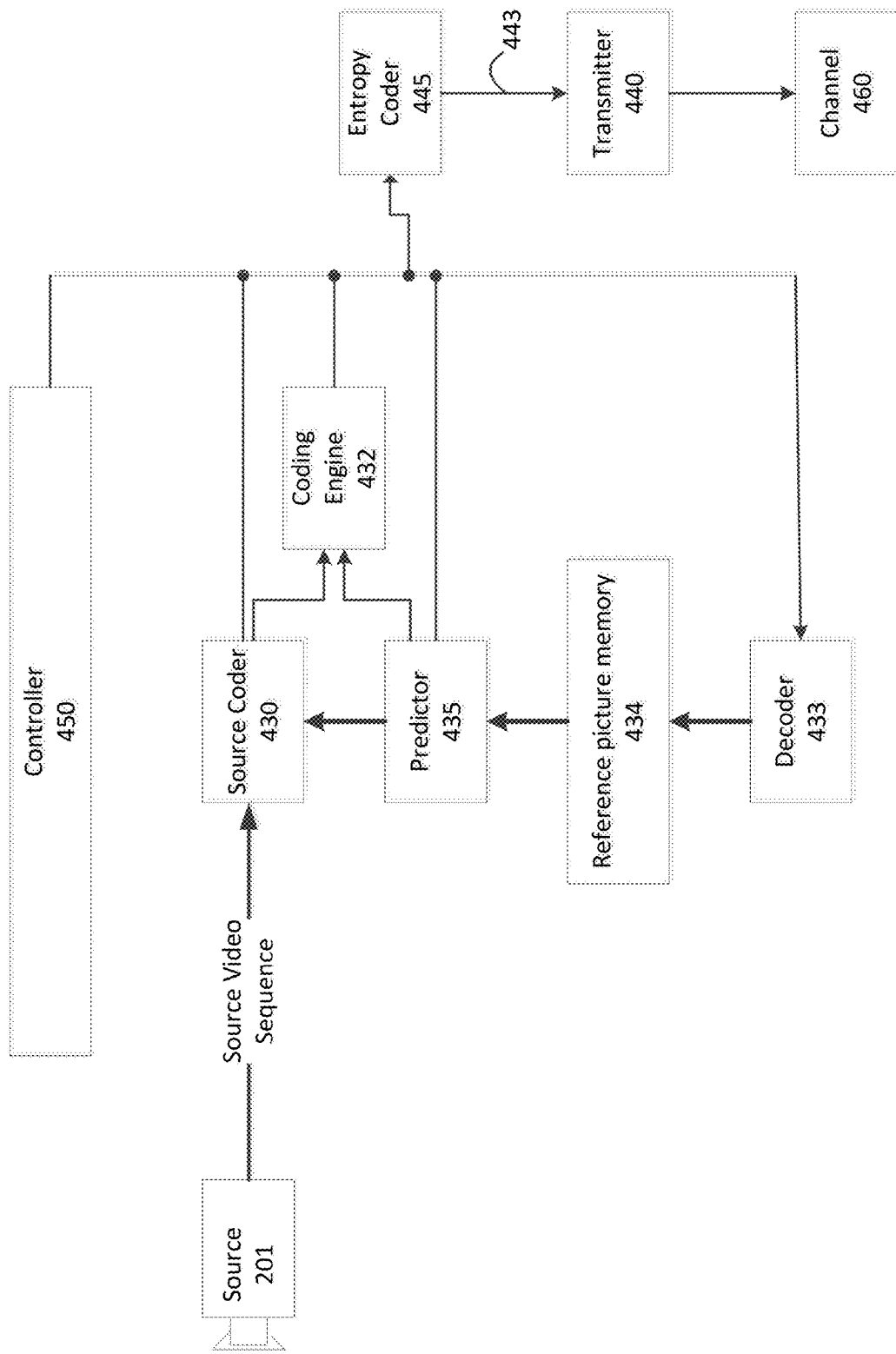
FIG. 4 is a schematic illustration of a simplified block diagram of an encoder in accordance with an embodiment.

FIG. 4 may be a functional block diagram of a video encoder (203) according to an embodiment of the present disclosure.

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video.

In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focuses on samples.

According to an embodiment, the encoder (203) may code and compress the pictures of the source video sequence into a coded video sequence (443) in real time or under any other time constraints as required by the application. Enforcing appropriate coding speed is one function of Controller (450). Controller (450) controls other functional units as described below and is functionally coupled to these units. The coupling is not depicted for clarity. Parameters set by controller (450) can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the art readily recognizes as a "coding loop". As an oversimplified description, a coding loop can consist of the encoding part of an encoder (430) ("source coder" henceforth) (responsible for creating symbols based on an input picture to be coded, and a reference picture(s)), and a (local) decoder (433) embedded in the encoder (203) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (433) can be the same as of a "remote" decoder (210), which has already been described in detail above in conjunction with FIG. 3. Briefly referring also to FIG. 3, however, as symbols are available and en/decoding of symbols to a coded video sequence by entropy coder (445) and parser (320) can be lossless, the entropy decoding parts of decoder (210), including channel (312), receiver (310), buffer (315), and parser (320) may not be fully implemented in local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

The disclosed subject matter can be applicable for motion vector refinement or any other technique wherein sample data from the already reconstructed picture is used to influence the reconstructed of sample data of the same given picture.

Figure 5:
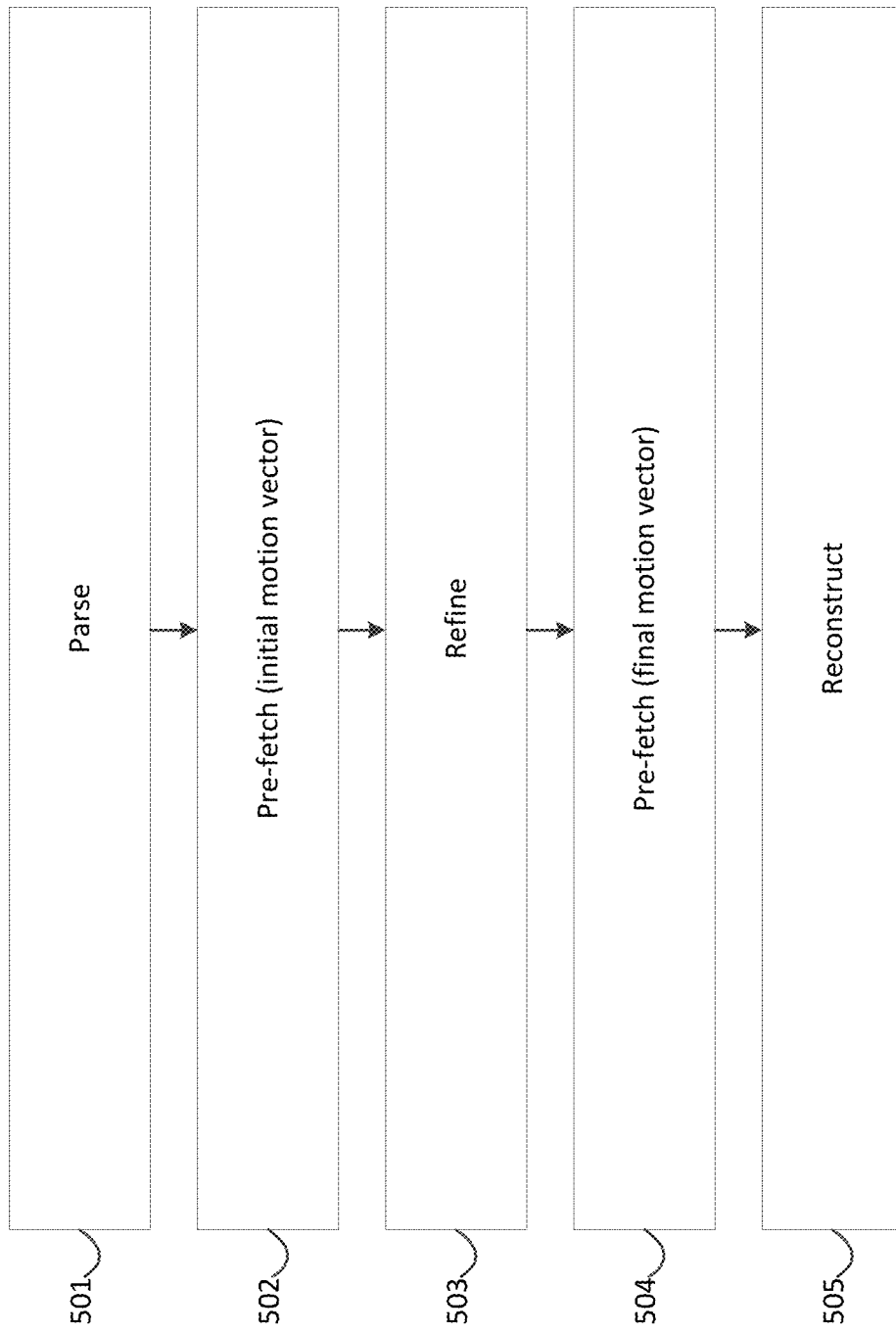
FIG. 5 is a schematic illustration of a flow chart of motion compensation with motion vector refinement in accordance with an embodiment.

FIG. 5 shows a conceptual flow diagram of the motion compensation of a block using a motion vector refinement technique based on sample data, as, for example, described in JVET-D0029. The technique is described henceforth under the assumption of two reference pictures and bi-prediction; however, it can equally apply to other forms of prediction including, for example, multi-hypothesis prediction, mixtures of intra block copy techniques with traditional reference picture based motion compensation, and so forth.

In a parsing step (501), one or more initial motion vector(s) are generated, by, for example, parsing the bitstream and decoding included symbols related to the motion vector(s), and using those decoded symbols in conjunction with already available (reconstructed) metadata (such as the motion vectors of surrounding blocks). While such a technique is commonly known as "parsing", it can, as described above, include mechanisms that go well beyond a strict definition of parsing (in the sense of converting a bitstream into a symbol stream). The result of the parsing step (501) are one or more initial motion vector(s) ("iMV(s)").

In a first pre-fetch step (502), reference picture memory can be accessed to obtain the sample data that can be required for the generation of the final motion vectors ("fMV(s)") through motion vector refinement. The number of such required memory access is described below. With only a few exceptions, encoder and decoder systems store the reference picture samples in reference picture memory. Such reference picture memory can be relatively slow and its access can be governed by certain hardware constraints. With only a few exceptions, a pre-fetch step can access reference picture memory in granularities such as cache lines, and copy entire cache lines into fast memory, cache memory, registers, or the like ("fast memory" henceforth), for quick access during the, in some cases computationally expensive, refinement step. The location of the sample data in the reference picture memory that is required for the generation of the fMVs) can be determined by traditional motion compensation techniques based on the iMVs.

In the refinement step (503), the pre-fetched reference picture sample data of step (502), in conjunction with the iMVs, and possibly other data, are used to create the fMVs. The disclosed subject matter does not limit the characteristics of the refinement step in any way. One possible refinement step can be as described in JVET-D0029.

In a second pre-fetch step, sample data in the reference picture memory as identified by the fMVs can be copied into the fast memory. Note that in at least some cases, the sample data access in accordance of the fMVs can be different than the sample data accessed in accordance to the iMVs. (If such data were always identical, then iMV would be always equal to fMV, and the refinement step would be redundant.)

Finally, a reconstruction step (505) reconstructs the samples of the block in accordance with the fMVs. That reconstruction step can use traditional techniques for bi-predictively coded, motion compensated blocks.

A person skilled in the art can readily understand that both motion vector refinement (503) and reconstruction (505) can include interpolation filters. The filters used in those steps can be the same or different, both in terms of memory access/bandwidth related properties (such as: number of taps), and other properties (such as: adaptivity, filter coefficients in use, and so forth). The description below assumes, for the sake of brevity, the use of the same interpolation filter in both refinement (503) and reconstruction (505). However, nothing herein prevents the use of interpolation filters of different characteristics, be they memory access/bandwidth related or otherwise, for refinement and reconstruction. A person skilled in the art can readily understand how the use of different filters influences the number of accesses required. The description below includes a few remarks regarding that.

Figure 6:
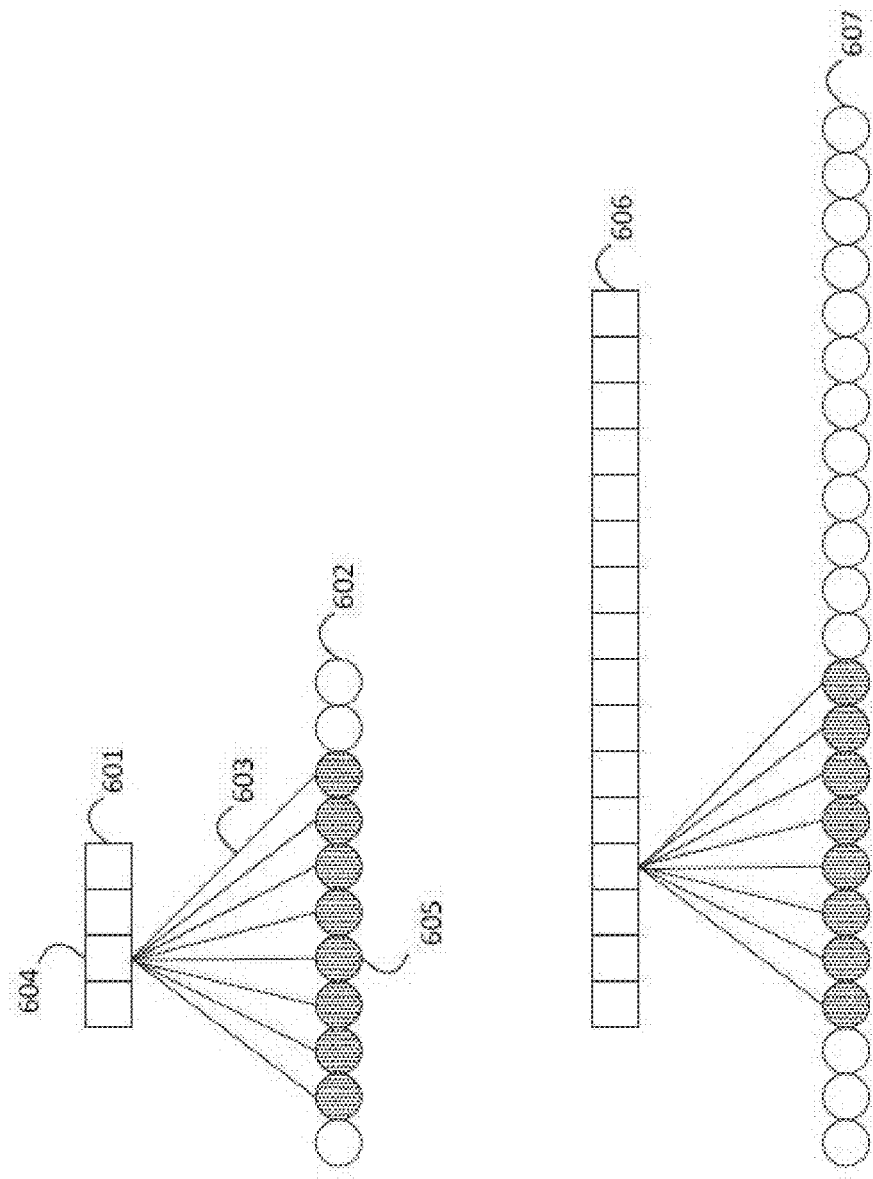
FIG. 6 is a schematic illustration of samples required for motion interpolation in accordance with an embodiment.

Referring now to FIG. 6, the memory bandwidth to reference picture memory needed for each pre-fetch step can be the number of samples in the reference picture memory that needs to be accessed in each pre-fetch step The amount of samples that needs to be pre-fetched in steps (502) and (504) can be dependent on a number of factors, including:

the size of the block; and the number of taps of the motion compensation interpolation filters.

In some modern video codecs, block sizes can vary widely. Focusing the discussion on a single dimension ("block length" henceforth), a block length can be as short as 4 luma samples or 2 chroma samples, and as long as 128 samples, 256 samples, or more.

Some embodiments herein are applicable to techniques that use eight tap filters, such as in accordance with the JVET project. Accordingly, for each sample to be interpolated, eight reference samples need to be accessed.

In a first example, assume a block (601) of 4 samples (only a single line of samples is depicted). For a block length of 4, this results in the need to access (4+8)−1=11 reference samples (shown as circles 602), assuming that samples that were recently accessed to interpolate an earlier sample in the same block stay in fast memory for the processing of later samples of the same block. Eight lines (603) are indicative of the eight shaded samples (605) required for interpolating a given sample (604) of the block (601).

For a block length of 16 samples (606), there is a need to access (16+8)−1=23 reference samples (607). From this example, a person skilled in the art can readily observe that the relative overhead of sample access due to interpolation filters decreases with increasing block size. That is the case when the interpolation filter size (in taps) is independent of the block size.

This observation can lead to certain design choices that can keep the overhead of small block interpolation in reasonable bounds. According to an embodiment, the number of accesses to samples or lines of samples (as described in more detail below), can be made dependent on the block size. In the same or another embodiment, for certain, pre-determined smaller block sizes (such as, for example, 4 samples, 8 samples, etc.), a video coding technology or standard can prohibit the use of motion vector refinement. In the same or another embodiment, for certain, pre-determined smaller block sizes, a video coding technology or standard can mandate the use of different interpolation filters for different block sizes; in order to minimize the overhead described above, advantageously, the interpolation filter used for smaller block sizes can use fewer taps than interpolation filters used for larger block sizes.

As there are two pre-fetch steps, and assuming the number of taps of the interpolation filters used in refinement and reconstruction is the same, the number of accesses needs to be doubled. Again under the assumption of an 8 tap interpolation filter, and focusing on a single dimension, for a four sample block, required would be 2*(4+8−1)=22 accesses to reference samples, and for a 16 sample block required would be 2*(16+8−1)=46 accesses to reference samples. If the filters were different, a person skilled in the art can readily modify the above calculation based on the number of filter taps used in each of the different filters.

Assuming the iMVs and the fMVs are not too diverse, there can be an overlap in the samples that are being fetched in the first and second pre-fetch steps. Specifically, if the difference between iMV and fMV is smaller than the block size, there is always an overlap. The difference between iMV and fMV, can be a pre-determined constraint of the video coding technology or standard. Working under the assumption that the fast memory is large enough to keep the samples of the first pre-fetch step and the samples of the second pre-fetch steps simultaneously (or, in other words, that there is no need to flush the fast memory before the second pre-fetch step), it can easily be seen that, again assuming a suitably constrained maximum difference between iMV and fMV, the second pre-fetch step does not need to fetch as many samples as the above calculation would suggest, because of the overlap between the sample data addressed by the iMVs and fMVs.

In order to get to a better approximation of memory bandwidth than just number of samples to be copied in each pre-fetch step, therefore, there is a third factor:

the maximum difference between the iMVs and fMVs.

Figure 7:
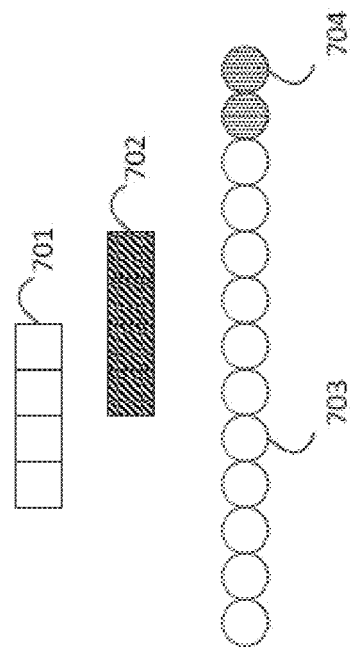
FIG. 7 is a schematic illustration of samples required for motion interpolation with motion vector refinement in accordance with an embodiment.

Referring now to FIG. 7, and again focusing only on the one-dimensional case, assume a maximum displacement of 2 samples as shown by the horizontal shift by two samples from the samples shifted according to an iMV (701), and the samples shifted according to the fMV (702). In that case, a majority of the pre-fetched samples of the first pre-fetch step, namely all reference samples depicted as unshaded circles (703) can be reused and do not need to be pre-fetched again in the second pre-fetch step. However, two additional samples (704) are required in the second pre-fetch step. For a block length of 4, an 8 tap filter, and a maximum difference between iMV and fMV of 2, the number of accesses would be (4+8−1)+2=13, wherein the second pre-fetch step, at most, would need to pre-fetch 2 samples. For a 16 sample block, the similar calculation would be (16+8−1)+2=25.

From above examples, it should be deduced that the number of samples that need to be accessed is:

$$\min((\text{block length}+\text{filter taps}+\text{max-displacement}-1),$$
$$(2*(\text{block length}+\text{filter taps}-1))$$

Briefly referring to FIG. 5, in some system designs, the setup of a memory access can be considerably more expensive (in terms of time) than the actual memory transfer itself. Accordingly, in such systems it is advantageous to pre-fetch all samples required for both the refinement (503) and the motion compensation/reconstruction (505) in the single (first pre-fetch (502), and omit step (504) entirely. This can be possible when certain constraints can be imposed on the influencing factors of block length, filter taps, overlap, as described below. The constraints can be imposed, for example, by a video compression technology or standard.

Up to this point, considered were only the memory accesses required to motion compensate a single block. A picture can be made up of many blocks; with a given block's size proportionally more when the block size is small compared to when the block size is large. As shown in the above examples, smaller block sizes incur substantially more overhead in memory accesses relative to the block size than larger block sizes, and as such, the memory bandwidth requirements can increase when small blocks are selected by the encoder.

It is well understood in video compression that a longer interpolation filter, especially when being content adaptive, can give better compression performance. Similarly, more freedom in the selection of motion vectors, including for example freedom of the encoder in selecting differences between iMV and fMV (minimizing overlap by maximizing the possible displacement), can give better compression performance. Finally, freedom of the choice of block size (including the use of small blocks) also can increase compression performance.

Accordingly, all three influencing factors can be constrained by a video compression technology or standard to balance their compression performance potential with their memory bandwidth increase potential.

So far, the description has focused on an analysis of a motion vector in only a single dimension. A person skilled in the art can readily generalize the above embodiments to two dimensions and would arrive, in some cases, in approximately a power of two increase in the additional memory bandwidth requirements compared to what is described above.

However, such generalization may not be always needed. Specifically, in at least some encoder and decoder systems, the reference memory is accessed not in the granularity of samples (or abstract cache lines of a size not directly related to video content properties), but in the granularity of line buffers. A line buffer can comprise all the samples (and stored reference picture metadata, if any) of a given line of samples in a reference picture, reference tile, and the like. In a line buffer based architecture, the overhead for motion refinement techniques such as the ones assumed above can be calculated in the granularity of additional line buffer fetches, using the vertical dimension only.

In an embodiment, an encoder or decoder compliant with a video coding technology or standard can balance a technical requirement for maximum memory bandwidth increase through the use of motion vector refinement with the coding gain obtainable through motion vector refinement, by imposing constraints on one or more of a maximum distance between an initial motion vector iMV and a final motion vector fMV, and a number of taps in an interpolation filter.

In the same or another embodiment, the constraints imposed on the maximum distance between an initial motion vector iMV and a final motion vector fMV, and the number of taps in an interpolation filter, can be such that the memory bandwidth increase through motion vector refinement can be zero.

Figure 8:
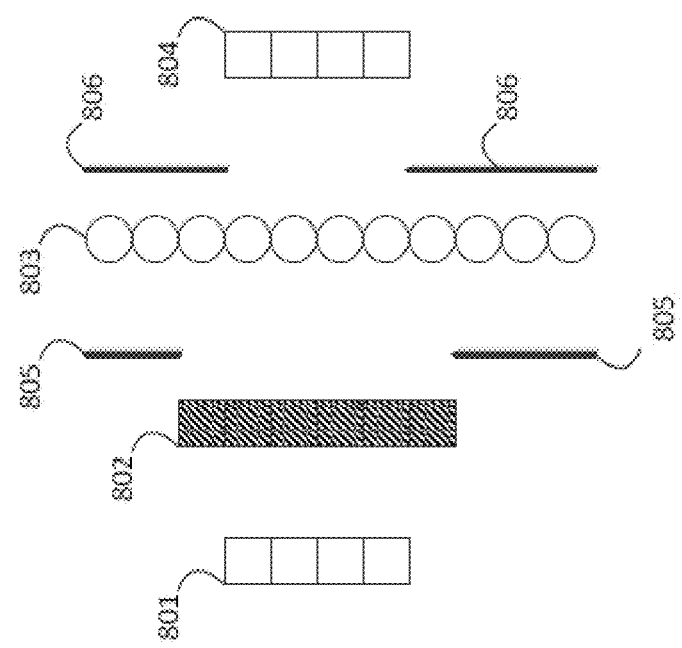
FIG. 8 is a schematic illustration of samples lines required for motion interpolation with motion vector refinement in accordance with an embodiment.

Referring now to FIG. 8, assume a line buffer based architecture. Accordingly, depicted henceforth is only a vertical dimension of samples under reconstruction or used for interpolation or motion vector refinement, with the understanding that many of those samples can be in the respective line buffers (shown only for one line of samples, and only partially).

Depicted is a block size of 4 vertical samples (801) already corrected by iMV, but the considerations below are applicable to any block size. Assume further the maximum difference between iMV and fMV is constrained to 2 samples by the video compression technology or standard; one sample in an "up" direction is equal to one sample in a "down" direction. This results, depending on fMV, in up to six samples (802) (more precisely, sample lines) that may be involved in the motion compensation of the block. Further, consider the interpolation filter size to be constrained to 6 samples. As a result, the number of samples (or, more precisely, sample lines) that need to be pre-fetched (803), and hence also the memory bandwidth requirements are identical to a scenario where there is an 8 tap interpolation filter and no motion vector refinement (804). Note that the six tap filter used to interpolate the six samples (802) can access up to two samples on "top" of the boundary of the six samples (802), and three samples at the bottom (marked by bold lines 805), whereas in case of the 8 tap filter, the possible access is three samples at the top and four samples at the bottom (marked by bold lines 806).

Generalizing the above observation, in the same or another embodiment, the constraints can be that the sum of the maximum distance between an initial motion vector iMV and a final motion vector fMV, and the number of taps in an interpolation filter used when motion vector refinement is in use, can be the same as the number of taps of an interpolation filter used when motion vector refinement is not in use. In that case, there is no increase in memory bandwidth through the use of motion vector refinement.

In the same or another embodiment, a certain, well-defined increase in memory access requirements (measured, for example, in line buffer accesses) can be accepted by a video compression technology or standard. This can be expressed by the number of taps of the interpolation filter used in conjunction with motion vector refinement ("refine-taps"), the number of taps of the interpolation filter taps used when no motion vector refinement is in use ("no-refine-taps"), and the maximum distance between an initial motion vector iMV and a final motion vector fMV ("distance"). The number of additional line buffer accesses can be (refine-taps+distance)−no-refine-taps). For example, let no-refine-taps be 8. If two additional line buffers are acceptable, then video compression technology or standard could have constraints such as refine-taps=8 and distance=2. This example can have the advantage that the interpolation filter can be the same for reconstruction with or without motion vector refinement. A maximum distance of 2 can be sufficient to obtain most of the theoretical coding efficiency gain possible with larger values of distance, at least for some content and some frequently used resolutions.

Figure 9:
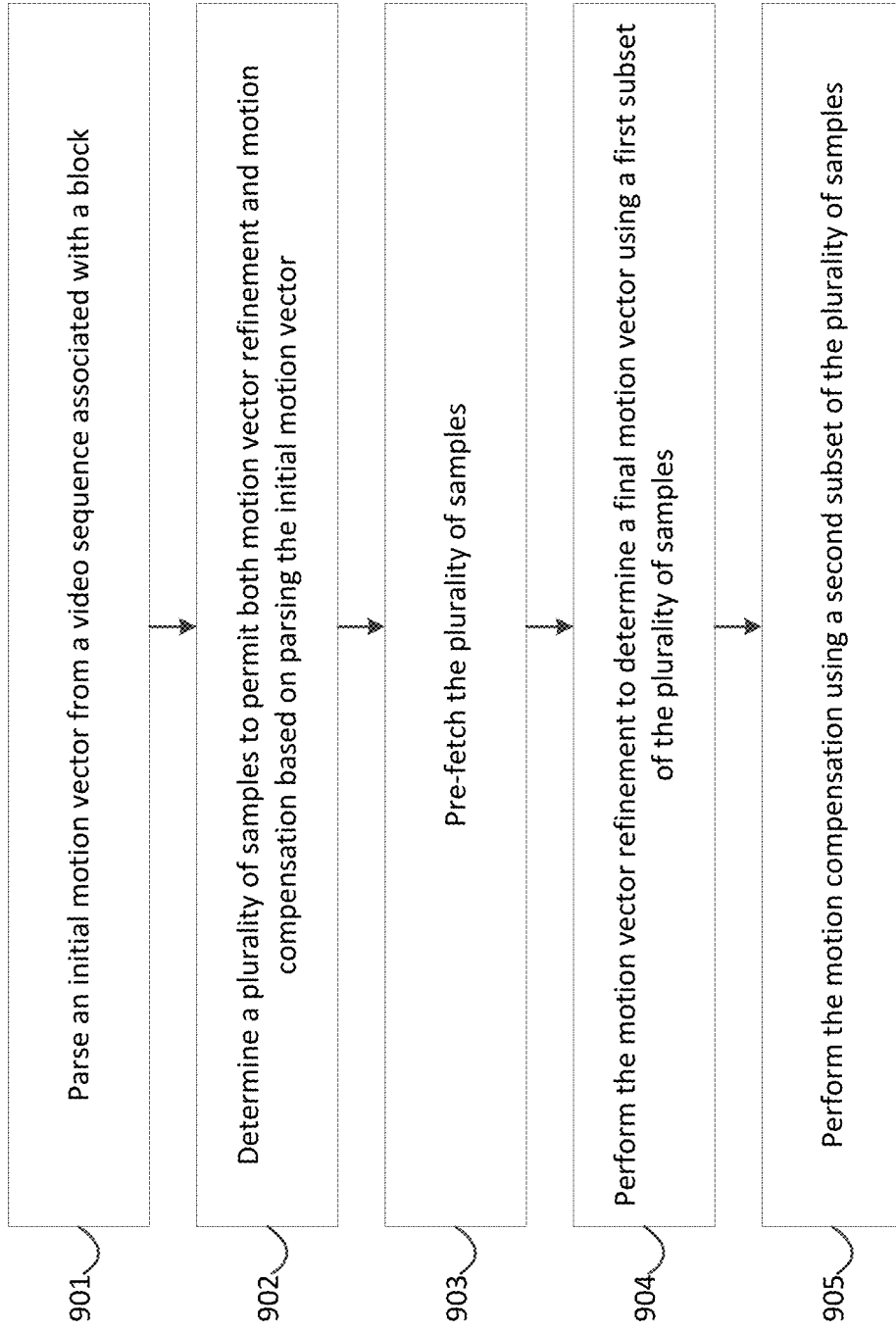
FIG. 9 is a flowchart of an example process in accordance with an embodiment.

FIG. 9 is a flowchart of an example process 900 for encoding of a video sequence in an encoder or decoding of the video sequence in a decoder. In some implementations, one or more process blocks of FIG. 9 may be performed by decoder 210. In some implementations, one or more process blocks of FIG. 9 may be performed by another device or a group of devices separate from or including decoder 210, such as encoder 203.

As shown in FIG. 9, process 900 may include parsing an initial motion vector from the video sequence associated with a block (block 901).

As further shown in FIG. 9, process 900 may include determining a plurality of samples to permit both motion vector refinement and motion compensation based on parsing the initial motion vector (block 902).

As further shown in FIG. 9, process 900 may include pre-fetching the plurality of samples (block 903).

As further shown in FIG. 9, process 900 may include performing the motion vector refinement to determine a final motion vector using a first subset of the plurality of samples (block 904).

As further shown in FIG. 9, process 900 may include performing the motion compensation using a second subset of the plurality of samples (block 905).

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

The Techniques for Memory Bandwidth Optimization in Bi-Predicted Motion Vector Refinement, described above, can be implemented as computer software using computer-readable instructions and physically stored in one or more computer-readable media. For example, FIG. 10 shows a computer system 1000 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 10 for computer system 1000 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1000.

Computer system 1000 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1001, mouse 1002, trackpad 1003, touch screen 1010, data-glove 1004, joystick 1005, microphone 1006, scanner 1007, camera 1008.

Computer system 1000 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1010, data-glove 1004, or joystick 1005, but there can also be tactile feedback devices that do not serve as input devices), audio output devices (such as: speakers 10010, headphones (not depicted)), visual output devices (such as screens 1010 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1000 can also include human accessible storage devices and their associated media such as optical media including CD/DVD ROM/RW 1020 with CD/DVD or the like media 1021, thumb-drive 1022, removable hard drive or solid state drive 1023, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1000 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (10410) (such as, for example USB ports of the computer system 1000; others are commonly integrated into the core of the computer system 1000 by attachment to a system bus as described below (for example Ethernet interface into a PC computer system or cellular network interface into a smartphone computer system). Using any of these networks, computer system 1000 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1040 of the computer system 1000.

The core 1040 can include one or more Central Processing Units (CPU) 1041, Graphics Processing Units (GPU) 1042, specialized programmable processing units in the form of Field Programmable Gate Areas (FPGA) 1043, hardware accelerators for certain tasks 1044, and so forth. These devices, along with Read-only memory (ROM) 1045, Random-access memory 1046, internal mass storage such as internal non-user accessible hard drives, SSDs, and the like 1047, may be connected through a system bus 1048. In some computer systems, the system bus 1048 can be accessible in the form of one or more physical plugs to enable extensions by additional CPUs, GPU, and the like. The peripheral devices can be attached either directly to the core's system bus 1048, or through a peripheral bus 10410. Architectures for a peripheral bus include PCI, USB, and the like.

CPUs 1041, GPUs 1042, FPGAs 1043, and accelerators 1044 can execute certain instructions that, in combination, can make up the aforementioned computer code. That computer code can be stored in ROM 1045 or RAM 1046. Transitional data can be also stored in RAM 1046, whereas permanent data can be stored for example, in the internal mass storage 1047. Fast storage and retrieve to any of the memory devices can be enabled through the use of cache memory, that can be closely associated with one or more CPU 1041, GPU 1042, mass storage 1047, ROM 1045, RAM 1046, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1000, and specifically the core 1040 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1040 that are of non-transitory nature, such as core-internal mass storage 1047 or ROM 1045. The software implementing various embodiments of the present disclosure can be stored in such devices and executed by core 1040. A computer-readable medium can include one or more memory devices or chips, according to particular needs. The software can cause the core 1040 and specifically the processors therein (including CPU, GPU, FPGA, and the like) to execute particular processes or particular parts of particular processes described herein, including defining data structures stored in RAM 1046 and modifying such data structures according to the processes defined by the software. In addition or as an alternative, the computer system can provide functionality as a result of logic hardwired or otherwise embodied in a circuit (for example: accelerator 1044), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for encoding of a video sequence in an encoder or decoding of the video sequence in a decoder, comprising:
    parsing an initial motion vector from the video sequence associated with a block;
    determining length of the block ("block length"), a number of taps associated with an interpolation filter ("filter taps"), and a maximum displacement between the initial motion vector and a final motion vector ("max displacement");
    determining a number of samples to be pre-fetched based on min((block length+filter taps+max displacement−1), 2*(block length+filter taps−1)));
    determining a plurality of samples to permit both motion vector refinement and motion compensation based on determining the number of samples to be pre-fetched;
    pre-fetching the plurality of samples based on determining the plurality of samples;
    performing the motion vector refinement to determine the final motion vector using a first subset of the plurality of samples; and
    performing the motion compensation using a second subset of the plurality of samples,
    wherein the first subset of the plurality of samples is different than the second subset of the plurality of samples.

2. The method of claim 1, wherein the maximum displacement between the initial motion vector and the final motion vector, measured in samples, is limited by a video compression technology or standard.

3. The method of claim 2, wherein, in accordance with the video compression technology or standard, and in association with the video sequence, another block is reconstructed without a motion vector refinement step, and
    wherein a first number of taps is used in association with a first interpolation filter associated with the block, and wherein a second number of taps is used in association with a second interpolation filter associated with the another block.

4. The method of claim 3, wherein a sum of the first number of taps and the maximum displacement between the initial motion vector and the final motion vector, measured in samples, is equal to the second number of taps.

5. The method of claim 3, wherein the first number of taps is different than the second number of taps.

6. The method of claim 1, wherein a video coding technology or standard prevents the motion vector refinement for at least one pre-determined block size.

7. A device for encoding of a video sequence in an encoder or decoding of the video sequence in a decoder, comprising:
at least one memory configured to store program code; and
at least one processor configured to read the program code and operate as instructed by the program code, the program code including:
parsing code configured to cause the at least one processor to parse an initial motion vector from the video sequence associated with a block;
determining code configured to cause the at least one processor to:
determine length of the block ("block length"), a number of taps associated with an interpolation filter ("filter taps"), and a maximum displacement between the initial motion vector and a final motion vector ("max displacement");
determine a number of samples to be pre-fetched based on min((block length+filter taps+max displacement−1), (2*(block length−filter taps−1)));
determine a plurality of samples to permit both motion vector refinement and motion compensation based on determining the number of samples to be pre-fetched;
pre-fetching code configured to cause the at least one processor to pre-fetch the plurality of samples based on determining the plurality of samples;
first performing code configured to cause the at least one processor to perform the motion vector refinement to determine the final motion vector using a first subset of the plurality of samples; and
second performing code configured to cause the at least one processor to perform the motion compensation using a second subset of the plurality of samples,
wherein the first subset of the plurality of samples is different than the second subset of the plurality of samples.

8. The device of claim 7, wherein the maximum displacement between the initial motion vector and the final motion vector, measured in samples, is limited by a video compression technology or standard.

9. The device of claim 8, wherein, in accordance with the video compression technology or standard, and in association with the video sequence, another block is reconstructed without a motion vector refinement step, and
wherein a first number of taps is used in association with a first interpolation filter associated with the block, and wherein a second number of taps is used in association with a second interpolation filter associated with the another block.

10. The device of claim 9, wherein a sum of the first number of taps and the maximum displacement between the initial motion vector and the final motion vector, measured in samples, is equal to the second number of taps.

11. The device of claim 9, wherein the first number of taps is different than the second number of taps.

12. A non-transitory computer-readable medium storing instructions, the instructions comprising: one or more instructions that, when executed by one or more processors of a device, cause the one or more processors to:
parse an initial motion vector from a video sequence associated with a block;
determine length of the block ("block length"), a number of taps associated with an interpolation filter ("filter taps"), and a maximum displacement between the initial motion vector and a final motion vector ("max displacement");
determine a number of samples to be pre-fetched based on min((block length+filter taps+max displacement−1), (2*(block length+filter taps−1)));
determine a plurality of samples to permit both motion vector refinement and motion compensation based on determining the number of samples to be pre-fetched;
pre-fetch the plurality of samples based on determining the plurality of samples;
perform the motion vector refinement to determine the final motion vector using a first subset of the plurality of samples; and
perform the motion compensation using a second subset of the plurality of samples,
wherein the first subset of the plurality of samples is different than the second subset of the plurality of samples.

* * * * *